Dec. 29, 1970    N. J. HARRICK    3,551,841
THIN FILM LASER DEVICE EMPLOYING AN OPTICAL CAVITY
Filed Jan. 30, 1967    2 Sheets-Sheet 1

INVENTOR.
N. J. HARRICK

BY
Frank R. Trifari
AGENT

United States Patent Office 3,551,841
Patented Dec. 29, 1970

3,551,841
THIN FILM LASER DEVICE EMPLOYING
AN OPTICAL CAVITY
Nicolas J. Harrick, Ossining, N.Y., assignor, by mesne
assignments, to U.S. Philips Corporation, New York,
N.Y., a corporation of Delaware
Filed Jan. 30, 1967, Ser. No. 612,428
Int. Cl. H01j 39/02; H01s 3/09
U.S. Cl. 331—94.5
4 Claims

ABSTRACT OF THE DISCLOSURE

Combining an optical cavity with a radiation-responsive electrical device to increase the absorption of the radiation in the device at preferred wavelengths. Improved photoemitters, photoconductvie devices and thin film lasers result.

Figure 1:
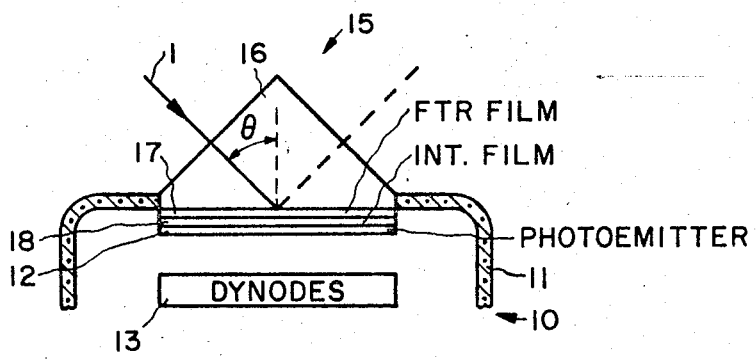

This invention relates to radiation-responsive electrical devices, that is, electrical devices having an element which upon absorption of externally-supplied radiation is capable of converting that radiation into some other desired energy form. Such devices include, among other things, photoemitters which convert by the photoelectric effect incident radiation into free electrons, photoconductors whose conductivity is varied by the incident radiation due to the generation of free charge carriers, and lasers which by the well-known lasing principles are caused to emit radiation when optically pumped by other radiation.

In my prior application filed jointly with A. F. Turner, Ser. No. 525,223, filed Feb. 4, 1966, now Pat. No. 3,436,-159 whose contents are hereby incorporated by reference, there is described an internal reflection spectrophotometer employing on the internal reflection element additional films referred to as an FTR and an intereference film to constitute an optical cavity in which incident analyzing radiation can be trapped so as to increase its interactions with an external absorbing medium on the surface of the interference film. The increased interaction is manifested in the recovered analyzing radiation by a reduced radiation level at wavelengths characteristic of molecular absorption in the absorbing medium. Thus, the effect of the optical cavity provided is on the analyzing radiation which is utilized after modification by the internal reflection element.

There are many electrical devices whose properties or behaviour depend on the interaction of an active element in the device with externally-supplied radiation, specifically by the absorption of that radiation. Construction of the absorbing element to maximize that absorption invariably requires a sacrifice in some other property or characteristic of the element. There are other electrical devices whose configuration is determined by its absorption requirement for the radiation, and limitations are thus placed on the geometry of the active element which reduce its utility. I have found that many of the deficiencies in these known electrical devices can be eliminated or reduced by associating with the element whose function is to absorb the radiation an additional device for greatly enhancing the ability of that element to absorb the radiation without modifying the configuration of the element. In particular, my invention is to combine with the absorbing element of the electrical device an optical cavity based on the principles described in my aforesaid prior application Ser. No. 525,223. As a result, limitations on the shape or configuration of this active absorbing element are eliminated. Another advantage is that the absorption enhancing cavity is wavelength selective enabling the absorption in the active element of the electrical device to be principally confined to one or a narrow band of wavelengths. Another feature is that the resonant wavelength of the cavity can be modified in a relatively simple manner.

Figure 2:
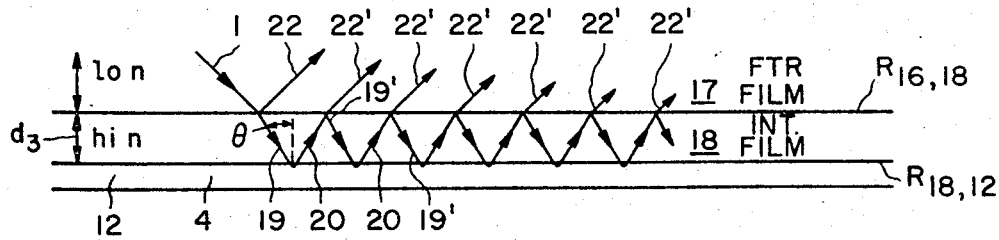
Figure 3:
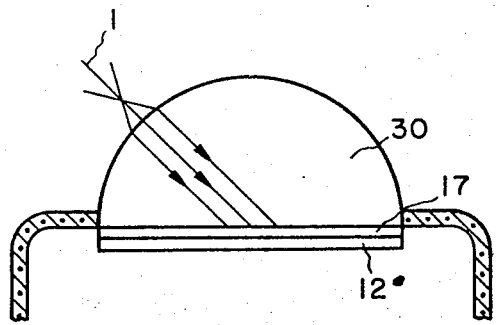
Figure 4:
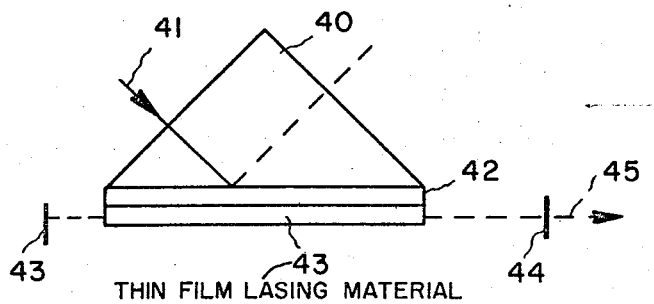
Figure 5:
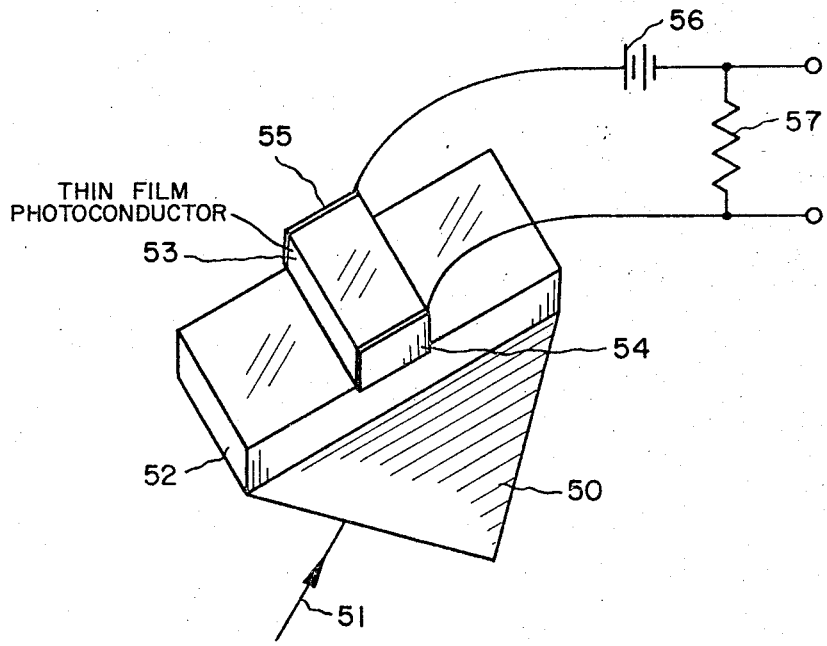

The invention will now be described in connection with specific radiation-responsive electrical devices, reference being had to the accompanying drawing wherein: FIG. 1 is a schematic view of the cathode end of the phototube employing one form of a device according to my invention; FIG. 2 is a schematic view on an enlarged scale of the optical cavity part of the phototube of FIG. 1 illustrating its behaviour; FIG. 3 is a schematic view of the cathode end of a modified phototube in accordance with my invention; FIG. 4 is a schematic view of one form of thin film laser in accordance with my invention; FIG. 5 is a schematic view of one form of photoconductive device in accordance with my invention.

My invention is generally appliacable to all electrical devices which operate by the absorption of externally-supplied radiation. By combining with such a device an optical cavity based on the principles described in my prior application, I can greatly enhance the absorption of the radiation in the active element of the device at selected wavelengths. Three examples of such electrical devices illustrating the improvement possible in performance will now follow, though it is to be understood that these are not to be considered in any way limitative of the scope of my invention.

PHOTOCATHODE

Construction of an efficient photocathode encounters a fundamental contradiction. On the one hand, the electron emissive layer has to be made sufficiently thick to absorb as much as possible of the incident radiation. On the other hand, the emissive layer should be made as thin as possible to insure that electrons wherever generated will have sufficient energy to reach the surface and be ejected into space. In general, the thicker one makes the layer to meet the photon absorption requirement, the smaller the number of electrons that results in space due to the increased absorption for electrons of the thicker layer. Reducing the layer thickness to reduce the electron absorption invariably reduces the photon absorption.

Efforts have been made to increase the efficiency of thin emissive layers by increasing the number of interactions between the radiation and the emissive layer. For example, in Applied Optics, vol. 4, No. 4, pp. 512–513, April 1965, and on page 10 of the April 1966 edition of SCP and Solid State Technology are described constructions for trapping by total internal reflection the incident radiation in the faceplate of a phototube to obtain multiple encounters of the light with the photocathode and thus increase its absorption by the cathode. In Zeitschrift Feur Physik, 151 (1958) pp. 536–555 is described another solution in which the photoemissive layer is made part of an interference system by mounting it on a reflecting mirror with a thin dielectric layer in between. While it may be possible to trap the radiation which is incident on the photoemissive layer in the latter by interference, the effective field is active over only a small part of the photoemissive layer in the interior, and there still remains the problem of freeing the electrons that are generated.

Combining an optical cavity with the photoemissive layer offers the advantages over these known techniques of further enhancing the absorption, of affording much greater control over the thickness and absorption of the photoemissive layer that can be employed without sacrificing absorption of the radiation, of allowing the use of thinner photoemissive layers, and of other improvements as will appear from the following description.

FIG. 1 illustrates one form of a phototube combined with an optical cavity in accordance with my invention. It comprises a phototube of the multiplier type 10 comprising a sealed envelope 11 enclosing an evacuated space containing an electrode system comprising a photocathode or emitter 12, and a series of multiplying and collecting dynodes 13. As is well known, each electron that is emitted from the photocathode 12 is accelerated to the dynode system where it is suitably multiplied and subsequently the multiplied stream of electrons collected and the result manifested by a current pulse in an output circuit (not shown) connected between the cathode and final dynode electrodes. In the prior art tube, the photocathode 12 is generally arranged on the inside surface of the tube faceplate, which is usually of glass and transparent to the radiation 1 to be detected. In the tube according to my invention, I mount an optical cavity 15 in the wall of the envelope 11, and on the optical cavity I provide a thin film photoemitter. The optical cavity 15 is similar to the optical cavity described in my prior application and comprises a transparent high refractive index element 16 for receiving the incident radiation 1, on a surface of which element 16 is provided a frustrated total reflection (FTR) film 17 of low refractive index material, on top of which is provided an interference film 18 of high refractive index material, and on the latter is provided the thin film photoemitter 12. The tube 10 is arranged so that the incoming radiation 1 traverses the prism 16 and is incident on the interface between the element 16 and the FTR film 17 at an angle of incidence exceeding the critical angle ($\theta_c$). When the thicknesses of the various layers are adjusted as will be later described to fulfill certain resonant conditions, the selected wavelengths of radiation multiply reflect within the interference film 18 establishing a standing wave pattern with an electromagnetic field, the evanescent field, at the interface between the interference film 18 and the photoemitter 12 which is extremely intense. Not only is the evanescent field intensified but it is strongly coupled to the photoemitter 12 with the result that a strong interaction is obtained throughout the whole thickness of the photoemitter even though the photoemitter is extremely thin and would normally be very weakly absorbing to directly received radiation at the same wavelength.

FIG. 2 shows on an enlarged scale the interference film 18 with the thin film photoemitter referred to by reference numeral 12 on its bottom exposed surface. The interference film 18 exhibits a relatively high index of refraction compared with the FTR film 17. The incident beam 1 on the interface results in a transmitted component 19, and a reflected component 22. As will be clear from my prior publications on internal reflection spectroscopy in "Annals of the New York Academy of Sciences," vol. 101, Article 3, pages 928–959 (1963), and "Analytical Chemistry," vol. 36, pages 188–191 (1964), whose contents are hereby incorporated by reference, a beam 19 incident on the interface of the interference film 18 and the outside environment or absorbing film 12 at an angle $\theta$ exceeding the critical angle actually penetrates slightly into the absorbing medium and thus interacts with the molecules of the absorbing medium. The beam 20 which reflects from that interface will be reduced in intensity by the energy absorbed in the absorbing film 12. Thus, the reflectivity $R_{18,12}$ at the interface will be equal to 100−A, where the value 100 represents the reflectivity at total reflection, and A represents the energy absorbed by the absorbing film 12. The reflected beam referred to by reference numeral 20 upon impinging upon the interface between the interface film and the FTR film will undergo a partial reflection represented by the component referred to by numeral 19′ and a partial transmission represented by the component referred to by numeral 22′, which reflections and transmissions will continue along the length of the interface as shown, but decreasing in magnitude, producing the reflected components referred to by reference numerals 19′ and the transmitted components referred to by reference numerals 22′. It will be obvious, of course, that FIG. 2 is merely illustrative, and for total interference all of the reflected components 22′ emerge to coincide with component 22. As is well known in connection with conventional interference films, by adjusting the thickness $d_3$ of the interference film 18—knowing also the angle of incidence $\theta$, the refractive index $n$ of the interference film, and the phase change that occurs when the beam penetrates the absorbing medium 12—one can control the phase of the transmitted components 22′ so that they are effectively 180° out of phase with the component 22, as occurs in, for example, the so-called anti-reflecting coating. This 180° phase adjustment is effective for those wavelengths of the incident beam for which the optical thickness of the interference film effectively equals a whole number of half wavelengths, which of course depends upon the angle of incidence $\theta$ and the refractive index of the interference film and the phase changes occurring at its interfaces. Thus, to intensitfy the interaction for a particular absorption band, one chooses a thickness $d_3$ and an angle of incidence such that the required 180° phase relationship of the transmitted components 22 and 22′ occurs. As will be further evident, with a fixed thickness $d_3$ of the interference film, variations of the angle of incidence $\theta$, which nevertheless must always exceed the critical angle, will enable the cavity represented by the interference film 18 to become resonant or "tuned" to different wavelengths.

As will be further evident to those skilled in this art, adjusting the phase of the transmitted components 22 and 22′ by means of the interference film is a necessary but not sufficient condition to completely cancel the transmitted components and thus insure that the radiation is indeed confined to the interference film. The second essential requirement is to match the amplitude of the reflected component 22 and the sum of the transmitted components 22′.

The function of matching the amplitudes to achieve cancellation is effected by the character of the FTR film 17, which thus determines the reflectivity $R_{16,18}$ seen by the incident beam. Reference is further made to U.S. Pat. No. 2,601,806 for a description of the technical requirements for constructing the FTR film 17 to provide the required reflectivity $R_{16,18}$ to match $R_{18,12}$. The FTR film 17 generally has a relatively low index of refraction compared with interference film 18 and a thickness which, together with the angle of incidence, is chosen to provide the required reflectivity. With the phase properly adjusted by the thickness and angle of incidence in the interference film, and the amplitudes matched by the thickness and composition of the FTR film 17, substantially complete absorption for one wavelength of a linearly polarized incident beam in a thin film absorbing medium 12 can be achieved. Generally speaking, for a first order, the thickness of the interference and FTR films will each be of the order of a wavelength or less. For a further detailed description of the operation of the optical cavity, reference is made to my prior copending application, Ser. No. 525,223, and Chapter V of my book entitled "Internal Reflection Spectroscopy," (1967), Interscience Publishers, a division of J. J. Wiley & Sons.

Construction of suitable cavities will now be described. Maximum absorption is achieved when two conditions are satisfied, viz., when there is amplitude matching, i.e., $R_{16,18}=R_{18,12}$, and when there is phase matching, i.e., the thickness of the interference film 18 adjusted so that there is resonance at the wavelength and angle of interest. $R_{18,12}$ is determined by absorption of the photoemitter 12 on the outer surface of the film 18. Largest amplification of the absorption for a given cavity, however, is obtained when $R_{18,12}<R_{16,18}$. Because the phase changes are different for total internal reflection, the resonant thickness is different for perpendicular and parallel polarization. These thicknesses become equal as $\theta$ approaches the critical angle, or if the structure is properly achromatized by use of birefringent material. For a given absorber, $R_{18,12}$ depends on polarization and therefore the optimum values of $R_{16,18}$ will be different for different polarizations.

The thicknesses of the FTR and interference layers required for complete absorption at any wavelength can be determined with reasonable accuracy where the optical constants of the absorbing photoemitter 12 are known. As an example, these optimum parameters have been computed for $\theta=25°$ for a Si ($n=3.5$) prism 16, $SiO_2$ ($n=1.45$) FTR spacer 17, evaporated Si ($n=3.1$) interference layer for a known Ag—O—Cs photoemitter 12 formed in a conventional manner on the interference film 18 with a thickness of about 100 A. The index of the photoemitter is assumed to be near unity, and a 5% absorption is expected at this thickness for $1.4\mu$ radiation. For parallel polarization, the thicknesses in microns of the FTR spacer and the interference layers required for maximum absorption in the photoemitter 12 is about $0.146\mu$ for the interference film, and about $1.48\mu$ for the FTR film.

The formulas used in the computation were:

$$\alpha_3 d_3 = \arctan \frac{\epsilon_3}{\epsilon_2} \frac{\gamma_2}{\alpha_3} + \arctan \frac{\epsilon_3}{\epsilon_4} \frac{\gamma_4}{\alpha_3} + m\pi \quad (1)$$

$$a = \frac{8 \frac{\epsilon_3}{\epsilon_1} \frac{k_2}{\alpha_3}}{\left(1 + \frac{\epsilon_2^2}{\epsilon_1^2} \frac{k_2^2}{\gamma_2^2}\right)\left(1 + \frac{\epsilon_3^2}{\epsilon_2^2} \frac{\gamma_2^2}{\alpha_3^2}\right) \sinh 2\gamma_2 d_2} \quad (2)$$

where $\epsilon_1$, $\epsilon_2$, $\epsilon_3$, and $\epsilon_4$ are the respective optical constants for the prism 16, FTR film 17, interference film 18, and photoemitter 12, $a$ is the estimated absorption (5%) in the photoemitter 12, $\theta_1$ is the angle of incidence (25°), $d_2$ is the thickness of the FTR film 17, $d_3$ is the thickness of the interference film 18, and $$\frac{\gamma_2}{\alpha_3} = \frac{\sqrt{\sin^2 \theta_1 - \frac{\epsilon_2}{\epsilon_1}}}{\sqrt{\frac{\epsilon_3}{\epsilon_1} - \sin^2 \theta_1}} \quad (3)$$

$$\alpha_3 = \frac{\omega}{c} \sqrt{\epsilon_1} \sqrt{\frac{\epsilon_3}{\epsilon_1} - \lim^2 \theta_1} \quad (3a)$$

$$\gamma_2 = \frac{\omega}{c} \sqrt{\epsilon_1} \sqrt{\lim^2 \theta_1 - \frac{\epsilon_2}{\epsilon_1}} \quad (3b)$$

$$\frac{\omega}{c} = \frac{2\pi}{\lambda} \quad (3c)$$

$$\frac{\gamma_4}{\alpha_3} = \frac{\sqrt{\sin^2 \theta_1 - \frac{\epsilon_4}{\epsilon_1}}}{\sqrt{\frac{\epsilon_3}{\epsilon_1} - \sin^2 \theta_1}} \quad (4)$$

$$\frac{k_2}{\alpha_3} = \frac{\cos \theta_1}{\sqrt{\frac{\epsilon_3}{\epsilon_1} - \sin^2 \theta_1}} \quad (5)$$

$$\frac{k_2}{\gamma_2} = \frac{\cos \theta_1}{\sqrt{\sin^2 \theta_1 - \frac{\epsilon_2}{\epsilon_1}}} \quad (6)$$

The optical constant $\epsilon_4$ for the photoemitter was estimated to be about 1. The variable $m$ is zero for the first order.

The thicknesses of the FTR spacer and interference layer can also be calculated in a simple manner for any case where the absorption does not exceed 10% per reflection. First $R_{18,12}$ can be estimated. For example, for 5% absorption $R_{18,12}=95\%$ and complete extinction is achieved by making $R_{16,18}$ also equal to 95%. $R_{16,18}$ can be adjusted to the desired value by adjusting the thickness of the FTR layer. The thickness of the latter will depend on the angle of incidence, polarization and refractive indices involved and can be calculated from equations given by Billings, J. Opt. Soc. of America, 40, 471 (1950), or Court and Willisen, Applied Optics, 3, 719 (1964), for example. The thickness, $d_3$, of the interference layer is determined from:

$$\frac{4\pi n_3 d_3 \cos \theta}{\lambda} - \delta_1 - \delta_2 = 2\pi m \quad (7)$$

where $\delta_1$ and $\delta_2$ represent the phase changes for total internal reflection at the internal surfaces of the interference film 18, $m$ is an integer corresponding to the reflection involved, $n_3$ is the refractive index of the layer, and $\lambda$ the resonant wavelength. In the first order ($m=0$) the thickness is given by:

$$d_3 = \frac{(\delta_1 + \delta_2) \lambda}{4\pi n_3 \cos \theta} \quad (8)$$

In general it is necessary to know the refractive indices of all of the materials to determine $d_3$ because they enter in the equations for $\delta_1$ and $\delta_2$. It is possible to make the cavity resonant at the same wavelength for both polarizations by choosing a suitable birefringent material for the phase layer, or by working at $\theta_1$ close to $\theta_c$ when $$\delta_\perp \approx \delta_\parallel$$

Because high fields and low walk-off are obtained for small angles, it is preferable to operate near the critical angle. The cavity can, however, be operated for angles ranging from $\theta = \sin^{-1} n_{16,17}$ to grazing incidence with, of course, a change in resonant wavelength given by Equation 7.

For best results, the incident beam 1 should be strongly collimated. For a focussed beam 1, an entering medium in the form of a hemicylinder 30 of radius $r$, as shown in FIG. 3, can be substituted for the prism 16. First order collimation can be obtained within the hemicylinder by focusing the beam 1 at a distance of $$f = \frac{r}{n_{30} - 1}$$

in front of the entrance surface, where $n_{30}$ is the index of the hemicylinder. The angle of incidence can then readily be changed in order to "tune" the cavity to a different wavelength. For a cavity consisting of a Si interference layer on an $SiO_2$ spacer, the tuning range, i.e., change of resonant $\lambda$ with $\theta$ given by Equation 7, can be made approximately a factor of 20, 6 and 4 for the first, second and third orders, respectively. Changing $\theta$ also changes $R_{17,18}$ and hence the peak absorption for the cavity is shifted to a different degree of absorption.

The modification in FIG. 3 also eliminates the interference layer as such, by replacing it by the photoemitter 12 directly, provided that it has a refractive index greater than that of the FTR film 17. In this case, the fourth layer would be vacuum, and the same calculations can be employed to determine the thickness of the layers 17 and 12. The construction of FIG. 1 is preferred, though, because no limitations are placed on the thickness of the photoemitter 12, and thinner emitters can be employed with increased probability that the photoelectrons generated will be ejected into the interelectrode space. The optical cavity arrangement in FIG. 1 is also preferred because an interference film of high index can be chosen enabling the cavity to be operated over a wider range of angles, viz., from $\theta = \sin^{-1} n_{17,16}$ to $\pi/2$; thus it can be tuned over a wider range of wavelengths and materials with a greater range in refractive indices for the photoemitter. Since there are two adjustable parameters, high Q can be obtained for any angle of incidence and maximum absorption can be induced in the photoemitter. It can also be constructed for either polarization.

The cathode construction of FIG. 1 also permits the obtainment of primarily monoenergetic electrons, i.e., an electron source which generates electrons whose energies are confined to a very narrow band. Such devices are extremely useful for precision measurements involving electron excitation of desired energy transitions or electron ionization of gasses to detect the presence of certain atoms which will only ionize when excited by electrons having a prescribed energy. To obtain a monoenergetic source of electrons, it is merely necessary to operate the device illustrated in FIG. 1 as close to the critical angle $\theta_c$ as possible using parallel-polarized radiation 1, with a photoemitter much thinner than one would employ for the usual phototubes, viz., 1–2 monolayers, to avoid straggling of the electrons emerging from the film. Under these conditions, the only E-field, evanescent field, present at the interface of the cavity with the photoemitter will be one normal to the surface. Hence, electrons will be ejected primarily normal to the surface, which electrons will have energies determined only by the quantum process involved.

In the photoemitter application so far described, the optical cavity is employed for efficient pumping of large quantities of energy into a thin film whose absorption is low and where little or no effect is obtained via conventional illumination. Another application where optical pumping of thin film materials with low absorption coefficients is important is, for example, in obtaining laser action in thin films.

THIN FILM LASER

This embodiment of the invention is illustrated in FIG. 4. It comprises as before an optical cavity comprising an entering element 40 in the form of a prism for receiving an incoming beam of radiation 41 at an angle of incidence exceeding the critical angle between the element 40 and a layer 42 on its surface corresponding to the FTR layer of FIG. 1. The second layer 43 illustrated in FIG. 4 corresponds to the interference layer.

This layer 43 is constituted of a material capable of lasing. Such materials, as is well known in the art, comprise a media in which is produced a population inversion in a characteristic energy level system when stimulated or optically pumped externally. They are often described in this art as being negative temperature media. Examples of such materials are well known from the extensive literature that has appeared in this art. These lasing systems generally include an optical cavity located at opposite ends of the lasing medium in the form of reflecting surfaces positioned with respect to each other and with respect to the negative temperature medium that light waves are multiply reflected therebetween traveling through the active medium on each passage. During each such passage, amplification occurs via interaction with the associated atomic or molecular resonators within the lasing medium. The conventional solid state lasers are in the form of rods with polished ends constituting the reflecting mirrors. The external pumping medium is conventionally a flash lamp which surrounds the rod. In general, the lasing action occurs along filaments extending throughout the length of the rod. By making one of the mirrors partially transmitting, an output beam is developed of high coherency and high energy density which has been used among other things for cutting or severing materials. For this purpose, a lasing beam in the form of a knife edge would be desirable. This would require a lasing medium in the form of a thin film. Such constructions have not been readily obtainable in the prior art because of the difficulty of absorbing sufficient radiation in a weakly absorbing film of the lasing medium to establish the population inversion condition essential to produce the lasing action. In this embodiment of the invention illustrated in FIG. 4, the optical cavity so increases the absorption of the pumping radiation 41 in the lasing film 43 as to enable lasing action to be accomplished employing reasonable quantities of pumping radiation 41. The multiply reflected lasing radiation would traverse the film 43 in a horizontal direction between the cavity forming reflectors 43 and 44. By making the reflector 44 slightly transparent, an output lasing beam 45 can be obtained.

The manner of choosing the materials for the embodiment of FIG. 4 and their thicknesses is done essentially the same as explained above in connection with the photoemitter. In this case, the lasing medium 43 is given a thickness enabling it also to function as the interference film to obtain the resonating action desired. In general, for best results, the entire assembly is maintained at a low temperature which enhances the lasing action. Examples of suitable lasing materials are indium arsenide for a wavelength of $3.15\mu$ and indium antimonide for a wavelength of $5.5\mu$. The entering element 40 may be constructed of germanium or silicon, and the FTR spacer 42 may be of silicon dioxide. The layers 42 and 43 may be provided by evaporation. It will of course be evident that other combinations of materials within the principles enunciated above will also prove satisfactory.

PHOTOCONDUCTIVE DEVICE

This embodiment is illustrated in FIG. 5 and illustrates, again, an assembly wherein an improvement in performance of an electrical device is obtainable by providing the active element in thin film form, with the optical cavity being employed for the purpose of enhancing the absorption of that weakly absorbing film for certain selected wavelengths of radiation. In general, the sensitivity of a photoconductor is determined by the maximum change in free carrier density produced in the material with and without illumination. By providing the photoconductor in thin film form, a very high dark resistance can be obtained. By now strongly coupling this thin film to the optical cavity, which tremendously enhances the absorption in the thin film of external radiatiaon, a very high free charge carrier density can be established in the photoconductive film resulting in a very low resistance. In the particular form illustrated in FIG. 5, again the active photoconductive layer also functions as the interference film of the optical cavity. The assembly comprises an entering element in the form of a prism 50 for receiving the incident radiation 51. On a surface of the prism 50 is provided an FTR spacer 52 and on the spacer is provided the active thin film photoconductor 53 of narrower width. The relative indices of refraction are that the indices of the photoconductor 53 and the prism 50 exceed that of the spacer 52, and the incoming radiation 51 is at an angle exceeding the critical angle for the prism 50-spacer 52 interface. At opposite sides of the photoconductor 53 are provided electrodes 54 and 55, which are connected by leads to the usual output circuit comprising a potential source 56 and a load resistor 57. Again, a wide choice of materials is available in order to obtain the absorption enhancement within the principles of the present invention. As examples only, the prism 50 may be of silicon, the spacer 52 of silcon oxide, and the photoconductor also functioning as the interference layer of germanium. The silicon prism 50 should be of high resistance material to minimize absorption. In the range of $1-2\mu$, silicon is substantially transparent whereas the germanium is absorbing. With the optical cavity present, much enhanced photoconductivity will thus be observed. The thicknesses of the layers can be readily determined using the principles set forth above. For detecting longer wavelength radiation, for example $10\mu$, the assembly may be maintained at a low temperature. In this case, the prism can be constituted of germanium, the FTR spacer of calcium fluoride, and the photoconductor 53 of mercury-doped germanium.

Not only is the invention useful for enhancing the absorption of weakly absorbing active films, but will also prove useful for efficient pumping of large quantities of energy into thin films whose relaxation times are very short. For example, in certain semiconductors, photoconductivity is associated with transitions involving the fast surface states. This has not yet been experimentally observed because of the short relaxation times involved. This invention provides a means for achieving this because of the possibility of greatly enhancing the number of transitions.

I have described improved electrical devices resulting from associating with a radiation responsive active element an optical cavity designed to trap the incident radiation within the active film or in a film adjacent thereto in order to intensify the number of interactions of that radiation with the active element. An important advantage is the creation of very intense electromagnetic fields in the active element which improves the probability of the absorption desired. The dimensions desirable to achieve the optimum performance have been given. It will, however, be fully appreciated that even in the event that the various layers are substantially mismatched, still an enhancement of the absorption over what would have been possible in the absence of the optical cavity would still be obtained. Thus, while ideally the phase change produced in the interference film should be 180°, and the reflectivity of the interfaces between the incoming element and the FTR and interference films should be exactly alike, this is not essential to the invention, and in practice substantial variations will still afford very significant improvements over the prior art arrangements. Similarly to what was explained in connection with my prior application, the use of an incoming element in the form of a plate in which the incoming radiation is itself multiply reflected by total reflection renders the reflectivity at the interface of the interference film and the active element less critical. Thus high absorption can still be obtained even with significant mismatches in the reflectivities. This offers the advantage of compensating for deviations in the beam collimation and other disturbances in the system. It will also be appreciated that the electrical devices of the invention can be operated in any wavelength range in which the active element is responsive to the radiation. Primarily this will be found in the visible and infrared range. The incoming element is of course chosen to be transparent to the selected wavelengths for which the cavity is to be resonant.

While I have described my invention in connection with specific embodiments and applications, other modifications thereof will be readily apparent to those skilled in this art without departing from the spirit and scope of the invention as defined in the appended claims.

What is claimed is:

1. In a laser device, a thin film active lasing element having a relatively high index of refraction which upon absorption of externally-supplied radiation generates radiation together with means for utilizing the generated radiation, the improvement comprising an optically thin film having a relatively low index of refraction on an outer surface of a radiation transparent member having a relatively high index of refraction with the optically thin film in contact with the active element, said radiation transparent member being positioned such that a beam of radiation traverses it to impinge on its interface with the inner thin film at an angle exceeding the critical angle, the inner thin film having characteristics including thickness such that the incident beam sees a reflectivity at the interface of the member with the film for at least one wavelength that substantially matches the reflectivity at the interface of the active element with the outside, the active element having characteristics including thickness such that, at said one wavelength, beam components emerging from the member interface with the films are in substantially phase-cancelling relationship, whereby the radiation is substantially confined in the active element producing enhanced interaction and absorption therein.

2. A laser device as set forth in claim 1 wherein the inner film has a thickness of the order of a wavelength or less and the active element has a thickness of the order of a wavelength or less.

3. In a laser device, an active element comprising a thin film of lasing material having a relatively high index of refraction which generates radiation in response to absorption of externally-supplied radiation together with means for passing the generated radiation, the improvement comprising joining the active film element over a substantial portion of its major surface with a radiation transparent member having a relatively high index of refraction separated from the active element by an optically thin layer having an index of refraction lower than that of the active element and the radiation transparent member, said radiation transparent member being positioned such that a beam of radiation traverses it to impinge on its interface with the inner layer at an angle exceeding the critical angle, the inner layer having characteristics including thickness such that the incident beam experiences a reflectivity at the interface of the member with the layer of at least one wavelength that substantially matches the reflectivity at the interface of the active element with the outside, the active element having characteristics including thickness such that, at said one wavelength, beam components emerging from the member interface with the layer are in substantially phase-cancelling relationship, whereby the radiation is substantially confined in the active element producing enhanced interaction and absorption therein.

4. A laser device as set forth in claim 3 wherein the inner layer has a thickness of the order of a wavelength or less, and the active element has a thickness of the order of a wavelength or less.

References Cited

UNITED STATES PATENTS 3,436,159  4/1969  Harrick et al. _____ 356—256

FOREIGN PATENTS 986,042  3/1965  Great Britain _____ 331—94.5

OTHER REFERENCES

Gunther et al.: "Enchancement of Photomultiplier Sensitivity by Total Internal Reflection," Applied Optics, volume 4, No. 4, April 1965, pages 512 and 513.

Livingston: "Enhancement of Photocathode Sensitivity by Total Internal Reflection as Applied to an Image Tube," Applied Optics, vol. 5 No. 8, August 1966, pages 1335 and 1336.

RONALD L. WIBERT, Primary Examiner

F. L. EVANS, Assistant Examiner

U.S. Cl. X.R.

250—207, 211